(12) United States Patent
Ortlieb et al.

(10) Patent No.: US 6,716,652 B1
(45) Date of Patent: Apr. 6, 2004

(54) METHOD AND SYSTEM FOR ADAPTIVE SAMPLING TESTING OF ASSEMBLIES

(75) Inventors: Thomas E. Ortlieb, Algonquin, IL (US); Walter Read, Woodridge, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 10/176,887

(22) Filed: Jun. 21, 2002

Related U.S. Application Data

(60) Provisional application No. 60/300,326, filed on Jun. 22, 2001.

(51) Int. Cl.[7] ............................................... H01L 21/66
(52) U.S. Cl. ............................................................. 438/14
(58) Field of Search .............................. 324/760, 158.1; 438/14

(56) References Cited

U.S. PATENT DOCUMENTS

| | | | |
|---|---|---|---|
| 6,167,545 A | 12/2000 | Statovici et al. | |
| 6,265,232 B1 * | 7/2001 | Simmons | 438/14 |
| 6,483,334 B1 * | 11/2002 | Hsieh | 324/760 |

* cited by examiner

*Primary Examiner*—John Niebling
*Assistant Examiner*—Andre' Stevenson
(74) *Attorney, Agent, or Firm*—Baker Botts L.L.P.

(57) ABSTRACT

A testing processor executes a plurality of test steps of an assembly test on successive units. A server informs the testing processor of a sampling frequency for each test step. The testing processor only executes those test steps whose sampling frequencies indicate that they are to be run on a particular unit. Upon detecting a failure associated with a particular test step, the server may inform the testing processor to adjust the sampling frequency of the particular test step such that the particular test step is to be executed on every subsequent unit to be tested. Upon receiving no further failures associated with the particular test step for a given number of units, the server may notify the testing processor to adjust the sampling frequency of the particular test step such that it need not be executed for every subsequent unit to be tested.

10 Claims, 5 Drawing Sheets

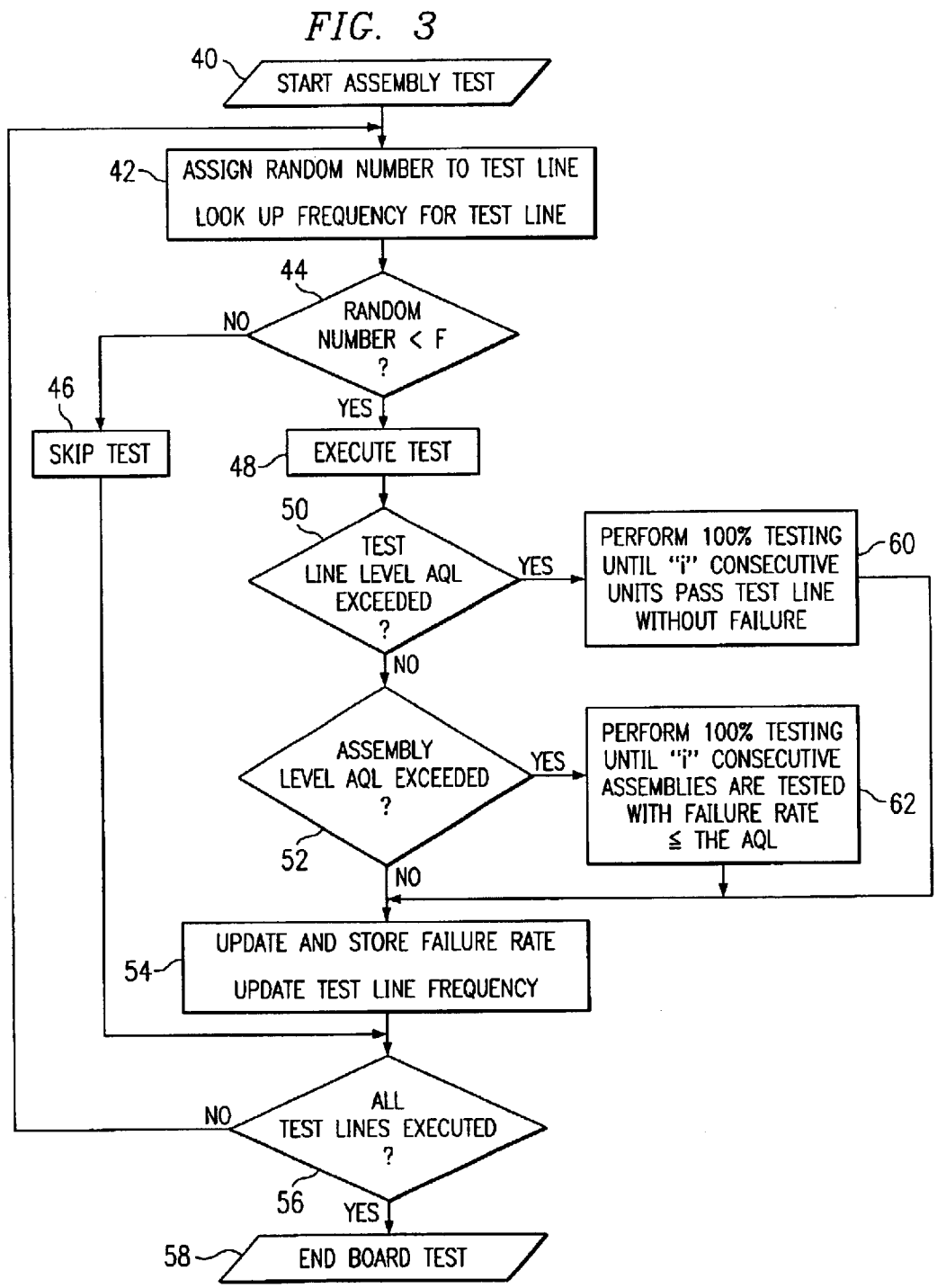

METHOD AND SYSTEM FOR ADAPTIVE SAMPLING TESTING OF ASSEMBLIES

RELATED APPLICATIONS

This application claims the benefit of U.S. Provisional Application Ser. No. 60/300,326 filed Jun. 22, 2001.

TECHNICAL FIELD OF THE INVENTION

The present invention relates in general to functional testing of circuit boards, subsystems, and the like and more particularly to a method and system for adaptive sampling testing of assemblies.

BACKGROUND OF THE INVENTION

In manufacturing, it is desirable to reduce production test cycle time while decreasing overall production test capital investment and operating cost. Conventional techniques to perform such savings included performing test program audits and reviews to identify tests that could be eliminated without impacting quality. Acceptance sampling techniques have also been employed in conventional production plants. A common application of acceptance sampling can be found in the material receiving departments of many companies. Received material is divided into lots or groups of units and a sample is drawn from each lot. The sample is tested or inspected and a determination is made as to whether to accept or reject the entire lot based on the tested/inspected sample. The result is that the manufacturing processes that consume the received material are protected from unacceptable levels of quality without relying on 100 percent testing by the receiving department.

However, these conventional techniques can not handle a high demand scenario or shipment deadline. For example, to complete a year end production plan, conventional functional testing had insufficient capacity to handle the product demand bursts. These bursts occur as a result of late arriving material from suppliers and contractors for key modules of a product. The bottleneck at the functional test could not leave enough time during the last few weeks of the year to test, pack, and ship the product. Thus, conventional functional testing techniques are inefficient during product burst demands.

SUMMARY OF THE INVENTION

From the foregoing, it may be appreciated by those skilled in the art that a need has arisen for a testing capability that can handle just in time requirements of product burst demands. In accordance with the present invention, a method and system for adaptive sampling testing of assemblies is provided that substantially eliminates or greatly reduces disadvantages and problems associated with conventional assembly testing techniques.

According to an embodiment of the present invention, there is provided a method for adaptive sampling testing of assemblies that includes selecting an individual acceptable quality level for each of a plurality of test steps of an assembly test. Each of the plurality of test steps is executed on a predetermined number of assemblies. A failure rate for each of the plurality of test steps is determined according to their respective individual acceptable quality levels. A sampling frequency is set for each of the plurality of test steps in response to their respective failure rates. Subsequent assemblies are tested using the assembly test where the assembly test for each subsequent assembly includes only those of the plurality of test steps according to their respective sampling frequency.

The present invention provides various technical advantages over conventional assembly testing techniques. For example, one technical advantage is to run those test steps on an assembly where a previous failure was detected. Another technical advantage is to run those test steps that have previously been successfully passed on only a certain number of subsequent assemblies. Yet another technical advantage is to adjust how frequent a particular test step is executed on subsequent assemblies in response to a pass or failure rate of the particular test. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates a simplified process flow for executing the test routine at the test station;

DETAILED DESCRIPTION OF THE INVENTION

Figure 1:
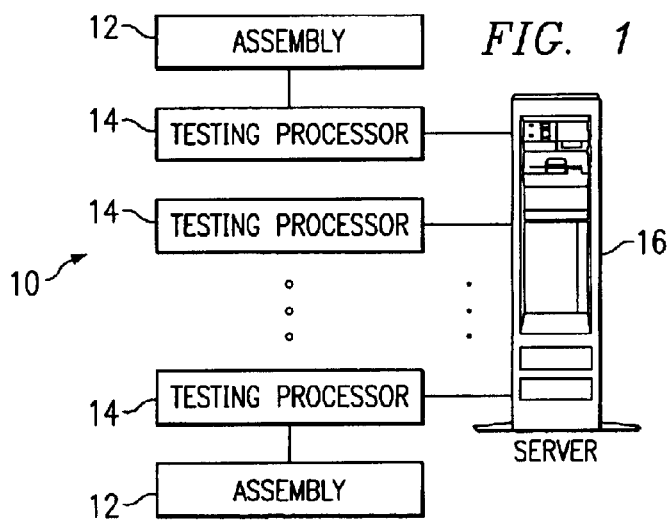
FIG. 1 illustrates a simplified block diagram of a test station.

FIG. 1 shows a block diagram of a test station 10. Test station 10 includes an assembly under test 12, a testing processor 14, and a server 16. Assembly under test 12 may be any device, assembly, subsystem, or system that is desired to be tested. Examples of what assembly under test 12 may be includes electronic boards, optical boards, system racks, board components, rack components, et al. Assembly under test 12 may be newly released or existing mature products. Testing processor 14 executes a variety of test steps on assembly under test 12. Server 16 keeps track of all test steps, their parameters, and failure rates. Server 16 may be coupled to other test stations 10 in order to provide testing reports and characteristics for a number of test stations 10 within an assembly and manufacturing location.

Figure 2:
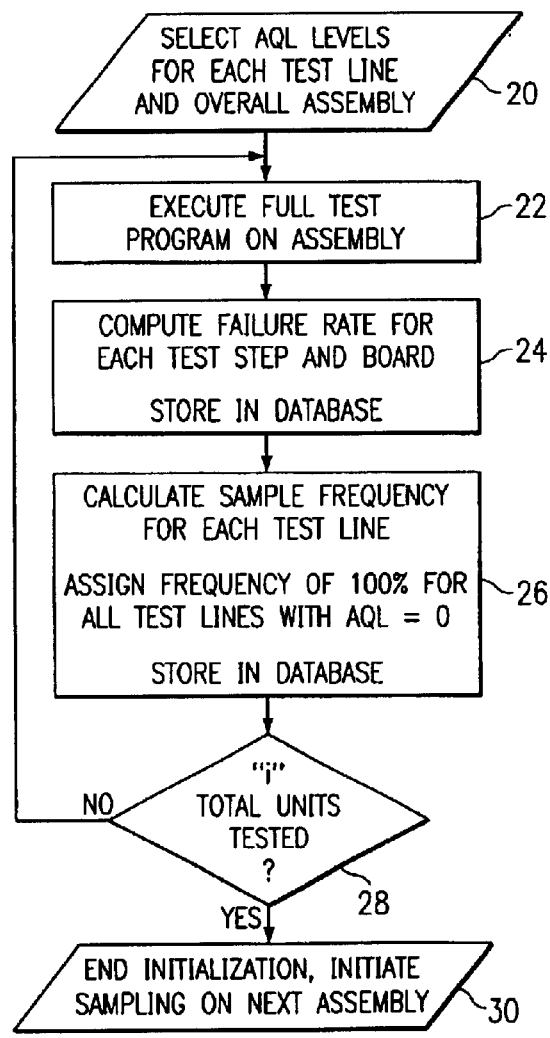
FIG. 2 illustrates a simplified process flow for initializing a test routine for the test station.

FIG. 2 shows a process flow performed by testing processor 14 to initialize an assembly test. At block 20, each test step of the assembly test is assigned an individual acceptance quality level (AQL) and assembly under test 12 is assigned an overall AQL. A production rate is defined for assembly under test 12 that is expressed as units produced per unit of time used with the individual AQLs to determine a sampling frequency. The full assembly test is executed on assembly under test 12 at block 22. A failure rate for each test step of the assembly test is computed based on the individual AQLs and a check is made on the overall AQL for assembly under test 12 at block 24. An actual quality level for a particular test step upon execution is compared to its individual AQL to determine its failure rate. Based on the failure rate calculations, a sample frequency for each test step is determined at block 26. A sample frequency of 100 percent indicates that the particular test step is to be executed on all assemblies being tested. A sample frequency of 50 percent indicates that the particular test step is to executed on only half a number of assemblies being tested. An individual AQL for a particular test step may be set to force a 100 percent sampling frequency. Preferably, an individual AQL of 0 failures is used to set a sampling frequency of 100 percent. A baseline number of assemblies are tested as assembly under test 12 in order to set the sampling frequencies for each test step. A determination is made at block 28 as to whether the baseline number of assemblies have been tested. If not, then the full assembly test is performed on a new assembly under test 12 to add to a database of failure rates for each test step according to the individual AQLS. If the baseline number of assemblies have been tested, then the initialization phase for the assembly test is completed at step 30. The assembly test implements the sampling frequencies for each step on the next assembly under test 12 to be tested and subsequent assemblies thereafter.

Each test step may be tracked by a test step name. Server 16 may maintain the average failure rate of each test step and the number of assemblies under test 12 tested by each test step. Data to determine a failure rate may come from test results from other test stations 12. Test results may be processed on a real time basis or on a periodic basis. As new results from test steps are obtained, failure rates may be recalculated. Server 16 may sort the test steps by failure rate and designate those test steps for sample testing at a corresponding sampling frequency unless the overall AQL has been exceeded. In this manner, a test step with an occasional failure will still be allowed to execute according to its sampling frequency. Server 16 provides testing processor 14 with information as to which test steps have a 100 percent sampling frequency and which test steps are sampled less frequently. During initialization, the sampling frequency of each test step is set to 100 percent so that all test steps are executed.

FIG. 3 shows the process flow for the assembly test during implementation of the sampling frequencies for each test step. After the start of the assembly test at block 40, a particular test step to be run is assigned a random number at block 42. Based on the random number assigned and its sampling frequency, a determination is made as to whether the particular test step is to be executed at block 44. If not, then the particular test step is skipped at block 46 and a subsequent test step is processed. If the particular test step is to be executed, execution of the particular test step is performed at block 48. Upon execution, a determination is made at block 50 as to whether the actual quality level of the particular test step exceeds its individual AQL. If not, a determination is made at block 52 as to whether the overall AQL for assembly under test 12 has been exceeded. If not, failure rate measurements for the particular test step are stored and updated and the sampling frequency for the particular test step is updated at block 54. If all test steps for the assembly test have not been executed as determined by block 56, a subsequent test step is processed. If all test steps for the assembly test have been completed at this point, the assembly test is ended at block 58 and a new assembly under test 12 is set up for assembly test execution.

If the individual AQL for the particular test step has been exceeded at block 50, the sampling frequency for the particular test step is set to 100 percent at block 60. The particular test step has its sampling frequency maintained at 100 percent until the particular test step has executed successfully for a predetermined number of assemblies without reporting any non-acceptable failures. If the overall AQL has been exceeded at block 52, the sampling frequencies for all test steps in the assembly test are set to 100 percent. The sampling frequency of 100 percent is maintained for all test steps in the assembly test until the overall AQL has not been exceeded for the predetermined number of assemblies. Throughout each test step and the assembly test for each assembly, results and parameters are measured and gathered in order to update the sampling frequencies for the test steps. This is a continuous process in order to provide accurate and up to date sampling frequencies for each test step. Thus, the present invention provides an adaptive continuous flow sampling test algorithm for the testing of various types of assemblies.

Upon a failure in a particular test step, server 16 will notify testing processor 14 that the particular test step is to be adjusted to a 100 percent sampling frequency. Upon not receiving a failure with the particular test step after the predetermined number of assemblies, server 16 may inform testing processor 14 to return the particular test step to sample testing and provide a new sampling frequency or revert to the previous sampling frequency. This situation covers the case of the one time failure detection being a glitch or false alarm in the test setup not repeating. If other failures occur during the predetermined number of assemblies, server 16 may force testing processor 14 to reinitialize its assembly test. Server 16 may also inform other test stations 10 to place this particular test step at a 100 percent sampling frequency to avoid defective assemblies from passing through undetected. Server 16 may also keep track of failures by test stations 10 in order to identify failures that may be peculiar to an individual test station.

Sampling frequencies may be assigned in a variety of ways. One example of sampling frequency assignment involves setting the sampling frequency for a particular test step to 50 percent after the particular test step has been successfully passed by a predetermined number of assemblies. The sampling frequency for the particular test step may be further reduced to 25 percent after the predetermined number of additional assemblies have successfully passed the particular test step. Though reductions to 50 and 25 percent sampling frequencies are described, the reduction in sampling frequency for the particular test step may be at any percentage and reduced to any desired rate. A failure occurring in the particular test step preferably forces its sampling frequency to 100 percent though adjustments of less than 100 percent to its sampling frequency may also be performed and may be based on how close the failure was to becoming a successfully passed test step.

Randomization of test steps having less than a 100 percent sampling frequency may be implemented. The random number assigned to a particular test step may determine whether the particular test step is to be performed on the first assembly after initialization of the assembly test. In one embodiment, particular test steps assigned the lowest 1/f numbers, where f is the sampling frequency of the particular test steps, are performed on the first assembly. Test steps assigned the next lowest 1/f numbers may be performed on the next assembly. Testing may continue on the next lowest 1/f numbered test steps until the 'i'th assembly has been tested. After the assembly test has been executed, failure rates may be updated and the flow of the test steps may bee adjusted based on updated sampling frequencies and regenerated random numbers.

The adaptive sampling assembly test of the present invention ensures that a quality product is delivered to customers, maximizes burst capacity, and minimizes implementation time across production facilities. A high outgoing test yield is an important criteria to maintain. The assembly test provides an ability to quickly detect downward shifts in yield and revert to 100 percent testing until corrective action can be taken. Minimizing the impact on the factory floor includes material handling and marking of sampled boards as well as the ease in changing from 100 percent testing to sample frequency testing.

Figure 4A:
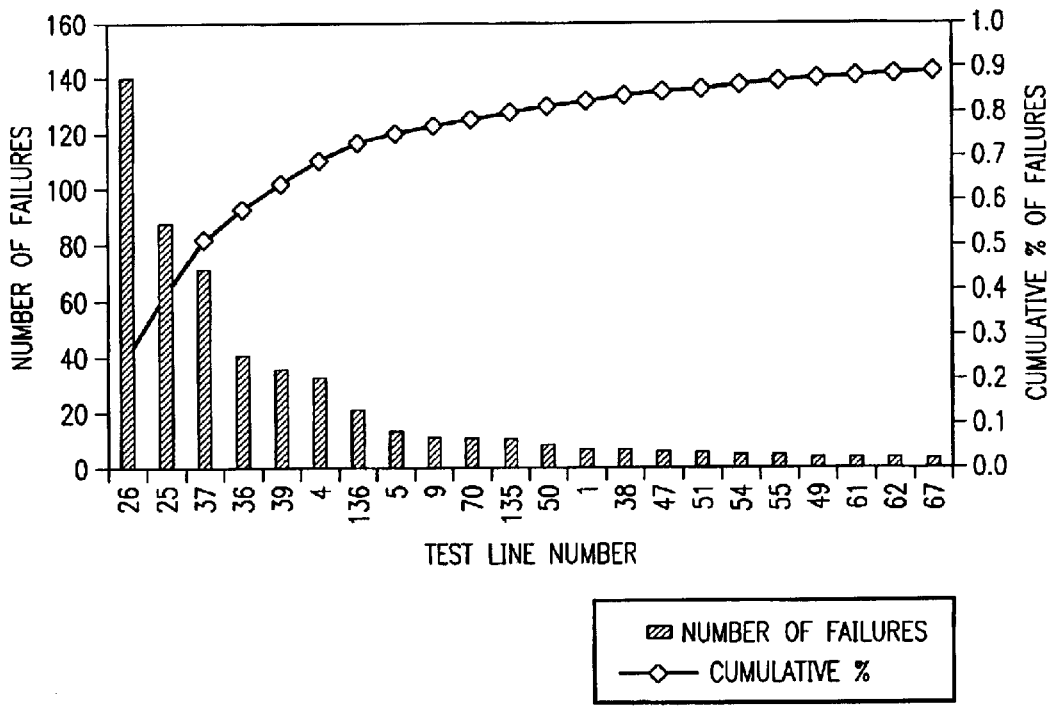
FIGS. 4A–B illustrate example graphs of defect data for different module types.
Figure 4B:
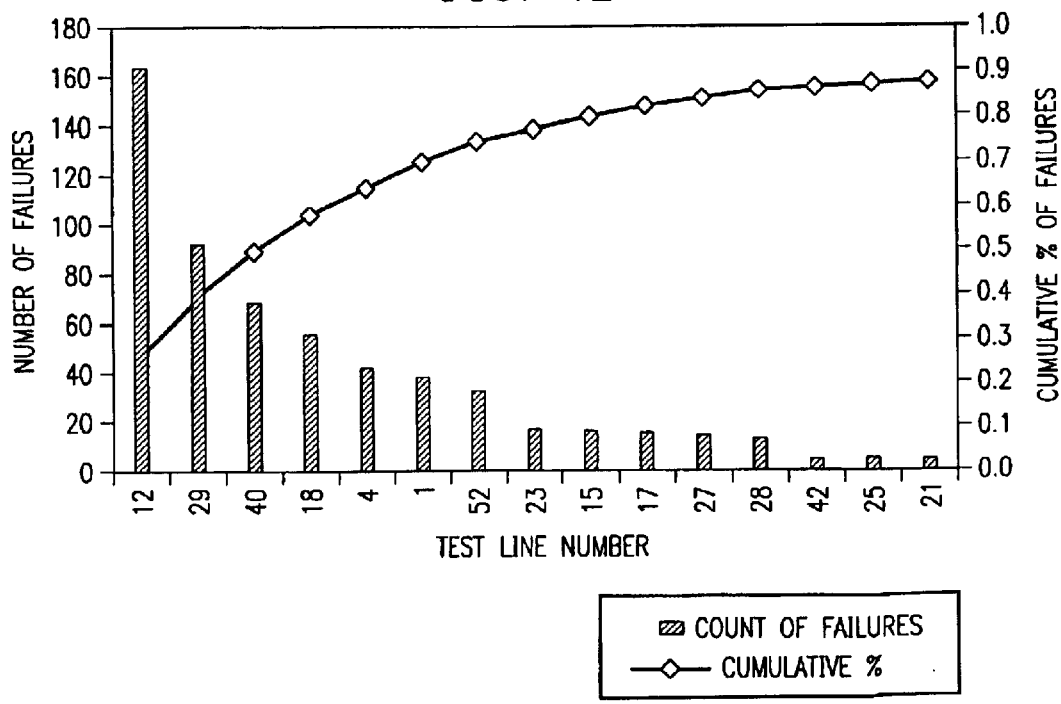

As an example of adaptive sampling implementation, testing of two different module types are analyzed. The module types have a short term volume need of approximately 11,000 units and the assembly test cycle times for each module are 6 minutes and 17 minutes respectively. First, an analysis step is performed to assess existing data and determine which test steps in the assembly program are finding pattern failures and which test steps are finding random, few, or no failures. FIGS. 4A–B show eight months of defect data on an approximate volume of 20,000 units for each module type. The data is sorted and put into pareto format by test step. A test step is considered an individual test that is performed to determine compliance of the unit to the associated functional product or process requirement. For module type A, 5 out of 179 test steps found over 80% of the failures. Over 130 test steps did not find a single failure. Similarly for module type B, 11 out of 136 steps found over 80% of the failures. Over 53 test steps did not find a failure on any of the 20,000 units tested. The patterns in this testing history by module type is used as the initialization for the design of the adaptive sampling program.

Second, sampling plans are assigned for each assembly test step to ensure effective management of quality and risk. The individual and overall AQLs are key elements of such a plan. The AQL is the lowest level of quality for a vendor's process that the consumer is willing to accept as a process average. An example of a vendor may be functional test and an example of a consumer may be a systems test or end-user of the product. The sampling plan should provide a high probability of acceptance when the process true failure rate is below the AQL and low probability of acceptance when above the AQL. An example of an AQL may be 0.65%, which would represent a quality level that is viewed as acceptable to the downstream systems test process. The systems test yields for both modules types are at or above 99%. The expectations is not that yields at systems test will drop from 99% to 98.35. All test steps with AQL set to zero are put through a screening type assembly test that removes the pattern failures. At a 99% functional test yield, an approximate 0.2% failure rate is expected to move through to systems test.

Given the AQL, a sampling plan is assigned for each test step. One sampling plan implementation may be to assign a sampling frequency of 8 units out of each 100 units. Here each unit is fully tested for the pattern failures (AQL=0), and the other test steps (AQL=0.65%) sampled at the rate of 8 per 100 units. If there is a failure in a particular step that is sampled, the program reverts to screening each unit for that test step until a total of 92 units are tested without additional failures occurring. Then sampling for the test step would resume Additionally, the testing frequency level may be increased to a frequency of 20 per 100 units in succeeding production. The tightened testing level may be maintained until 10 consecutive groups of 100 units pass without failure. The testing sample frequency may then return to a reduced frequency of 8 per 100 units. Similar to the individual test step analysis, the module level AQL is selected. One method of doing this is to add the pattern failure rate and individual module AQL's together. For these modules the pattern failure rate was determined to be 1.8% and 2.1% for module A and B respectively. Adding the individual AQL rate of 0.65% to these rates would result in AQLs of 2.45% and 2.75% being assigned. If the actual module level failure rate observed in production exceeds this level, the program would revert to 100% screening each module for all test steps for a predetermined number of units until the actual failure rate is demonstrated to be below the module level AQL.

Figure 5A:
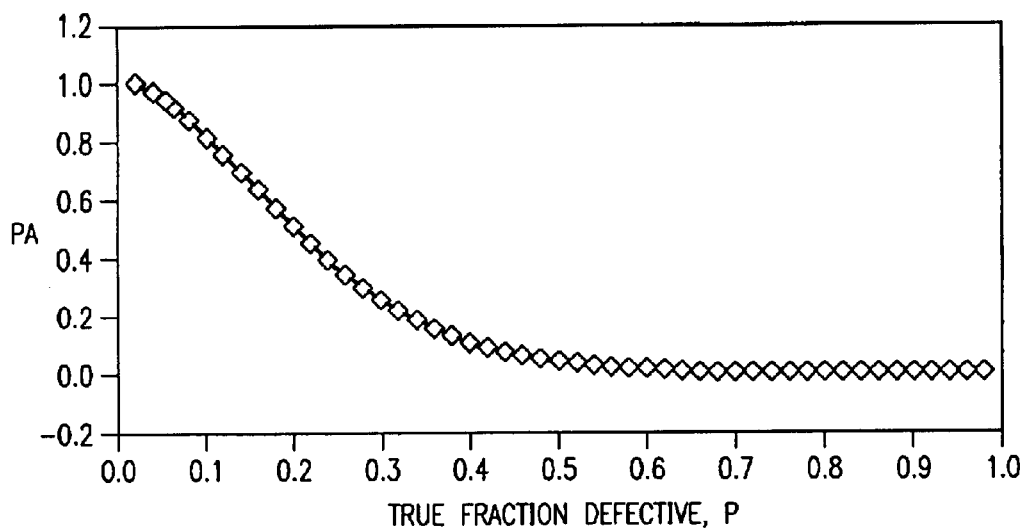
FIGS. 5A–B illustrate example graphs of Operating Characteristics for the test routine.
Figure 5B:
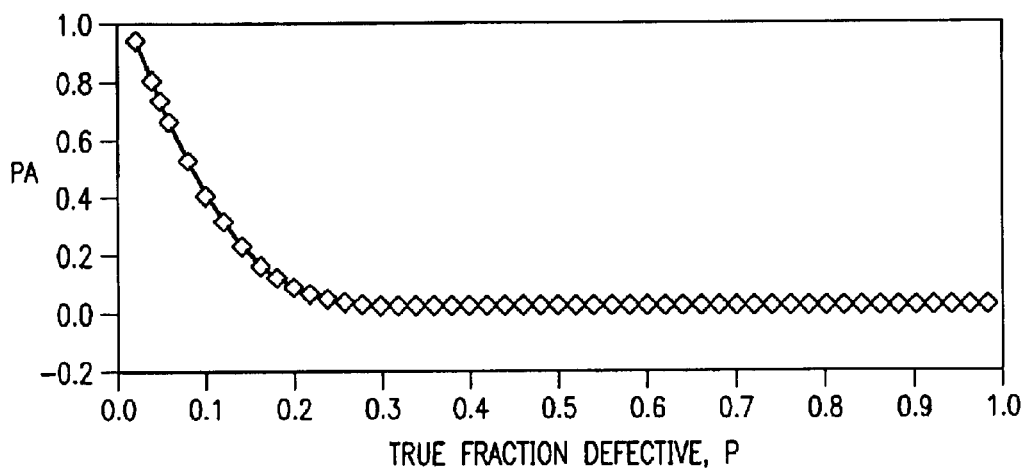

It is important to assess sampling plan performance under varying production situations to understand potential consequences. FIGS. 5A–B show one way for assessing the sampling plan. An Operating Characteristics Curve shows the sensitivity of the sampling plan to a sudden burst of defects being input to the assembly test. The graphs for reduced and normal inspection levels show that the probability of accepting a group of boards with an incoming failure rate of 20% is 40% and 10% respectively. For the reduced inspection rate, this means that units have a 40% chance of being accepted and sent through without further testing. If the 20% failure rate continued to be input into the Assembly test, the probability of acceptance would drop from 40% on the first sample to 16% on the second sample and to 6.4% on the third sample. The result is that it will take a number of successive 100 unit groups before the problem is discovered. Under normal inspection levels, The number of successive groups of units that will be needed is lower since there is only a 10% chance of accepting groups of units.

Figure 6A:
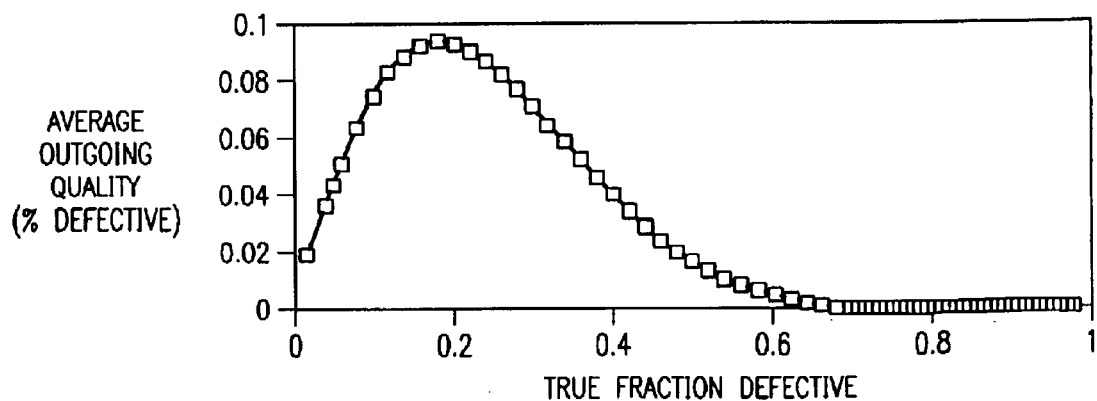
FIGS. 6A–B illustrate example graphs of Average Outgoing Quality Levels for the test routine.
Figure 6B:
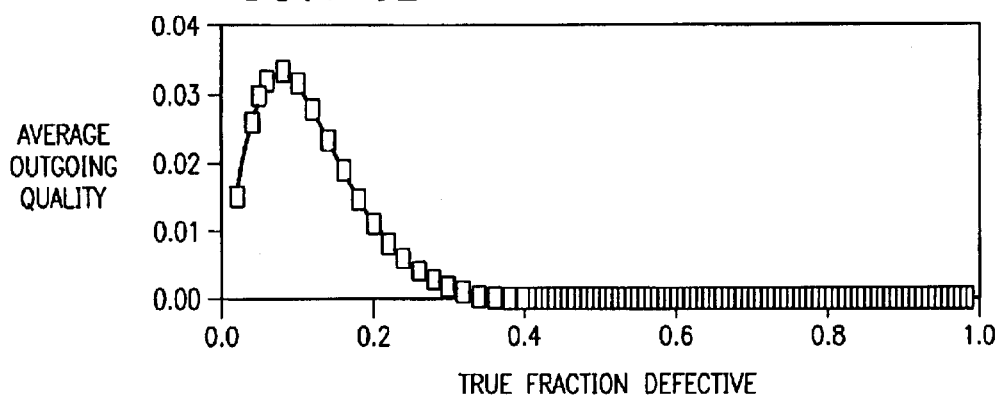

Another way to view sampling plan performance is with the Average Outgoing Quality Level. FIGS. 6A–B show the effect at a given incoming defect rate. When incoming defect rates are high, more groups of units are rejected and 100% rectify tested. The impact is that with an increasing true defect rate, the AOQL will increase, reach a maximum, and then decrease. The peak AOQLs for the reduced and normal inspection levels are 9% and 3.5% respectively. Since the assembly test is reverted to the normal inspection level after the first unit failure, the 3.5% AOQL could be considered the worst case scenario for causing failures to pass through with a 10% incoming defect rate.

Figure 7A:
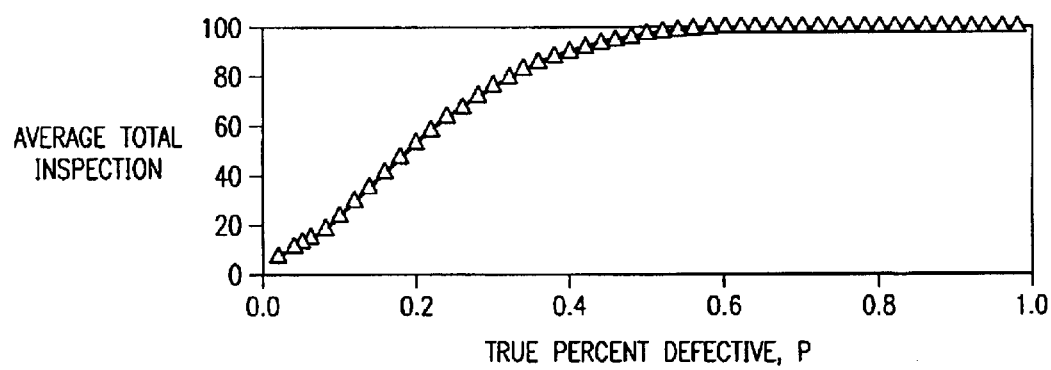
FIGS. 7A–B illustrate example graphs of Average Total Inspection for the test routine.
Figure 7B:
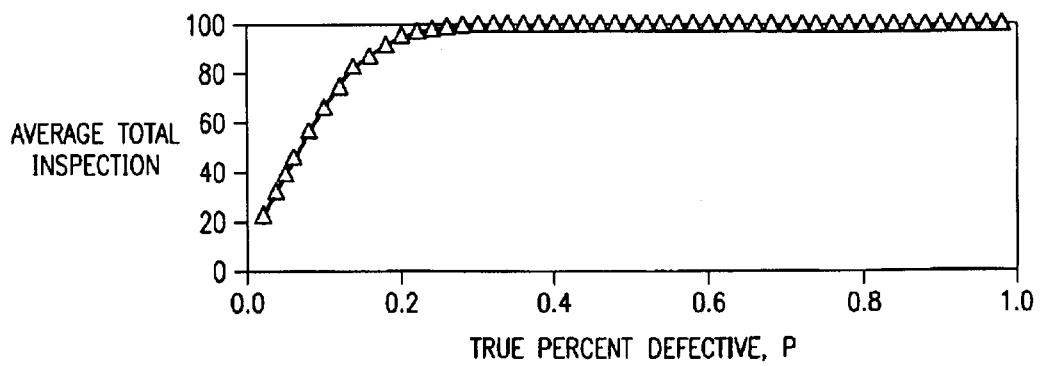

Another performance indicator is the Average Total Inspection. FIGS. 7A–B show the effect of the rectifying test being performed on groups of units that are rejected as the defect rate is increased. Effectively, this is a measure of how effective the sampling plan is to operate. From the producer's point of view, a minimum number of units to be tested is desired when quality performance is acceptable. Also, the amount of product inspected increases as the incoming defect rate increases. If the incoming defect rate is 20%, under reduced inspection levels the ATI is about 50 units while the ATI would be about 90 units under the normal inspection level.

Third, the defect data and the sampling plan are used to develop and change the assembly test. An evaluation of the assembly test is made to determine which test steps are to be 100 percent executed on every unit and which test steps may be moved to sampling at less than 100 percent. Test steps are also evaluated on the basis of impact on total test cycle time, coverage of the fault in later testing, and potential risk of severe product failure to the customer. Each test step is categorized as being either needed for the assembly test or as a candidate for sampling. Upon determination and categorization, the full assembly test may be run on the first 8 units and the adaptive sampling assembly test may be run on the remaining 92 boards subject to failure detection. For module type A, the total number of test steps executed went from 179 under the full assembly test to 39 test steps executed during the adaptive sampling assembly test and the test cycle time went from 6 minutes to 3 minutes 15 seconds. For module type B, the total number of test steps executed went from 136 under the full assembly test to 78 test steps executed during the adaptive sampling assembly test and the test cycle time went from 17 minutes to 9 minutes.

Fourth, continuous monitoring is performed on each test step of the assembly test to update failure rates. Sampling frequencies may be adjusted to reflect the updated failure rate data. For example, if a test step continues to report no errors for a given number of units, its sampling frequency may be reduced so that it is executed on fewer units than in a previous group of units tested. Monitoring and adjusting of the assembly test may be performed automatically without test operator intervention. Design of the assembly test may include an ability to flag a test operator when certain corrective action is needed.

Thus, it is apparent that there has been provided, in accordance with the present invention, a method and system for adaptive sampling testing of assemblies that satisfies the advantages set forth above. Although the present invention has been described in detail, it should be understood that various changes, substitutions, and alterations may be made herein. For example, the present invention may be applicable not only at the functional test and system test levels, but also to an entire end to end testing environment and any subtesting performed therein. Other examples may be readily ascertainable by those skilled in the art and may be made herein without departing from the spirit and scope of the present invention. Moreover, the present invention is not intended to be limited in any way by any statements or any example made in describing the present invention that is not otherwise reflected in the appended claims.

What is claimed is:

1. A method for adaptive sampling testing of assemblies, comprising:
   selecting an individual acceptable quality level for each of a plurality of test steps of an assembly test;
   executing each of the plurality of test steps on a predetermined number of assemblies;
   determining a failure rate for each of the plurality of test steps according to their respective individual acceptable quality levels;
   setting a sampling frequency for each of the plurality of test steps in response to their respective failure rates;
   testing subsequent assemblies using the assembly test, the assembly test including only those of the plurality of test steps according to their respective sampling frequency.

2. The method of claim 1, further comprising:
   selecting an overall acceptable quality level for the assembly test;
   determining whether, the overall acceptable quality level for the assembly test has been exceeded;
   setting the sampling frequency of each of the plurality of test steps to 100 percent in response to the overall acceptable quality level being exceeded.

3. The method of claim 2, further comprising:
   executing the assembly test on a set number of subsequent assemblies;
   determining whether the overall acceptable quality level for any of the set number of subsequent assemblies has been exceeded;
   setting the sampling frequency for each of the plurality of test steps in the assembly test according to their respective failure rates in response to the overall acceptable quality level of all of the set number of subsequent assemblies not being exceeded.

4. The method of claim 1, further comprising:
   executing a particular one of the plurality of test steps according to its sample frequency on a subsequent assembly;
   determining whether the individual acceptable quality level for the particular one of the plurality of test steps has been exceeded.

5. The method of claim 4, further comprising:
   setting the sampling frequency of the particular one of the plurality of test steps to 100 percent in response to its individual acceptable quality level being exceeded.

6. The method of claim 5, further comprising:
   maintaining the sampling frequency of the particular one of the plurality of tests steps at 100 percent until the individual acceptable quality level has not been exceeded for a set number of successive assemblies.

7. The method of claim 4, further comprising:
   determining whether an overall acceptable quality level associated with the assembly test has been exceeded in response to the individual acceptable quality level not being exceeded.

8. The method of claim 7, further comprising:
   setting the sampling frequency of each of the plurality of test steps to 100 percent in response to the overall acceptable quality level being exceeded.

9. The method of claim 8, further comprising:
   maintaining the sampling frequency of each of the plurality of test steps at 100 percent until the overall acceptable quality level has not been exceeded for a set number of successive assemblies.

10. The method of claim 7, further comprising:
    updating the sampling frequency of the particular one of the plurality of test steps.

* * * * *